United States Patent
Higgins et al.

(10) Patent No.: US 8,904,302 B2
(45) Date of Patent: Dec. 2, 2014

(54) IDENTIFICATION OF SEMANTICALLY RELEVANT CONCEPTS IN A GRAPHICAL MODEL

(75) Inventors: Daniel Forrest Higgins, Hopkinton, MA (US); Syed Salman Qadri, Framingham, MA (US); Aditya Agrawal, Cambridge, MA (US); Kenneth Weiss, Farmingham, MA (US)

(73) Assignee: The MathWorks, Inc., Natick, MA (US)

( * ) Notice: Subject to any disclaimer, the term of this patent is extended or adjusted under 35 U.S.C. 154(b) by 457 days.

(21) Appl. No.: 12/895,187

(22) Filed: Sep. 30, 2010

(65) Prior Publication Data

US 2012/0084695 A1     Apr. 5, 2012

(51) Int. Cl.
*G06F 3/048* (2013.01)
*G06F 9/44* (2006.01)

(52) U.S. Cl.
CPC ... *G06F 8/34* (2013.01); *G06F 8/33* (2013.01)
USPC .......................................... 715/771; 715/769

(58) Field of Classification Search
USPC ................................. 715/771, 769
See application file for complete search history.

(56) References Cited

U.S. PATENT DOCUMENTS

| | | | | |
|---|---|---|---|---|
| 6,823,495 B1 * | 11/2004 | Vedula et al. | ................. | 715/805 |
| 7,475,351 B1 * | 1/2009 | Johnson | ........................ | 715/736 |
| 2008/0092109 A1 * | 4/2008 | Kinnucan et al. | ............. | 717/105 |

FOREIGN PATENT DOCUMENTS

WO     2007/136684 A2     11/2007

OTHER PUBLICATIONS

Stovsky, Michael P. et al., "Stile: A Graphical Design and Development Environment," Handbuch der Anorganischen Chemie, pp. 247-520 (1986).
International Search Report and Written Opinion for Application No. PCT/US2011/054265, dated Jan. 25, 2012.
International Preliminary Report on Patentability for Application No. PCT/US2011/054265, 10 pages, dated Feb. 21, 2013

* cited by examiner

*Primary Examiner* — Andrea Leggett
(74) *Attorney, Agent, or Firm* — Nelson Mullins Riley & Scarborough LLP

(57) ABSTRACT

In an embodiment, a plurality of graphical elements of a graphical model may be displayed on a display device. An indication of a graphical operation involving a first graphical element of the plurality of graphical elements may be received. The graphical operation when performed may establish a relationship between the first graphical element and one or more other graphical elements of the plurality of graphical elements that are compatible with the graphical operation. Two or more graphical elements of the plurality of graphical elements that are compatible with the graphical operation and one or more characteristics associated with the first graphical element may be identified. A visual indication may be provided on the display device. The visual indication may indicate that the identified plurality of graphical elements is compatible with the graphical operation.

18 Claims, 12 Drawing Sheets

Block Properties
550

- Block Sample Times 552
- Restrictive Flags 554

Block Port Properties
560

- Dimension Attributes 562
- Data Types 564
- Sample Rates 566
- Complexity 568
- Unit Attributes 570
- Physical Domain Attributes 572
- Communication Protocol Attributes 574

Data Properties
580

- Data Type 582
- Value Range 584
- Data Dimensionality 586

*Fig. 5B*

IDENTIFICATION OF SEMANTICALLY RELEVANT CONCEPTS IN A GRAPHICAL MODEL

BRIEF DESCRIPTION OF THE DRAWINGS

FIG. 5B graphically depicts properties referred to in act 530 of FIG. 5A.

DETAILED DESCRIPTION

Figure 1:
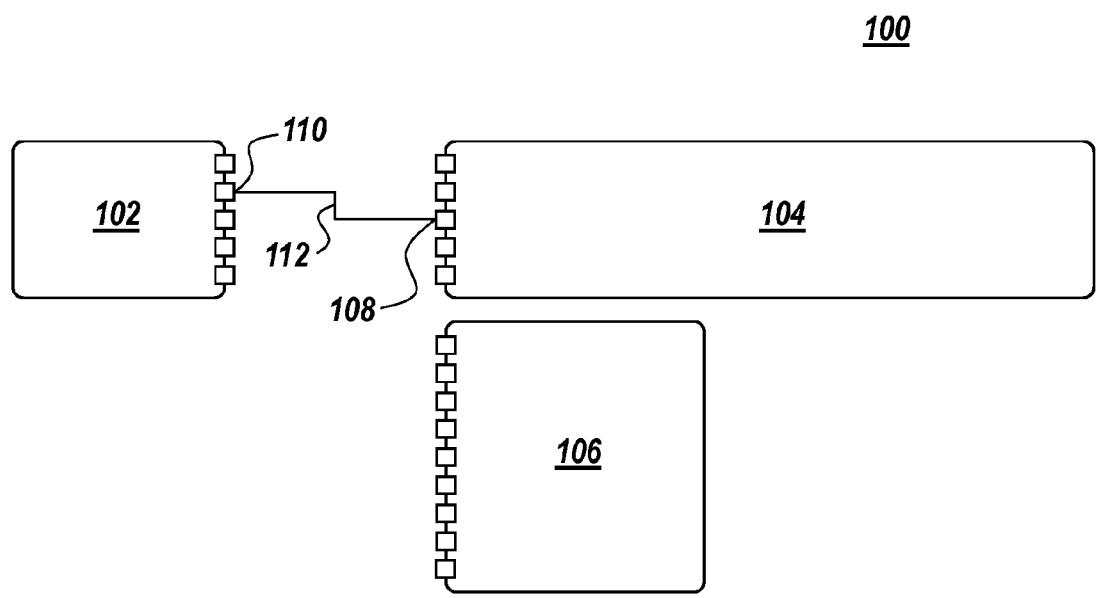
FIG. 1 depicts a portion of an exemplary graphical model of a system.

Dynamic systems may include systems whose behaviors typically change over time. Dynamic systems may be representative of many real-world systems, such as a control system, a media processing system, a pendulum, a bouncing ball, or a car. It is often desirable to create a model of a dynamic system so that predictions can be made regarding the behavior of the system without the need to construct or test a real-world version of the dynamic system.

Graphical modeling environments may be programs that may enable, for example, a user to construct and analyze a graphical model of a process or system. Examples of graphical modeling environments may include, for example, time-based block diagram environments, such as Simulink® available from MathWorks Inc., Natick, Mass., discrete event diagram environments and state machine diagram environments, such as those found within Stateflow®, also available from MathWorks, Inc., data-flow diagram environments, such as LabVIEW, available from National Instruments Corporation, Austin, Tex., and diagramming environments, such as Unified Modeling Language (UML) diagramming environments, and other graphical modeling environments.

Graphical modeling has become a common technique for designing models of dynamic systems because graphical modeling software packages typically provide sophisticated software platforms that may include a rich suite of support tools that makes the analysis and design of dynamic systems using models efficient, methodical, and cost-effective. A graphical model may include one or more graphical elements that together may represent a dynamic system. Historically, engineers, scientists, and other professionals have utilized graphical models in numerous areas such as feedback control theory and signal processing, finance, mathematics, and/or other areas to study, design, debug, and refine dynamic systems associated with those areas.

Graphical models may be event-driven, data-driven, or time-driven, among other possibilities. A graphical model may also be constructed using a combination of time-driven, event-driven, and data-driven elements. These elements may include one or more nodes. The nodes may be interconnected by one or more lines. The nodes and lines may have different semantic meanings depending on a number of factors. These factors may include, for example, which type of graphical model they are used in and how they are used in the graphical model.

Some or all nodes in an event-driven graphical model may react to one or more events, which may occur in a system represented by the model. The model may contain (1) one or more nodes which may represent one or more states in the system and (2) one or more lines (sometimes represented as arrows) which may represent one or more transitions between states in the system. An example of an event-driven graphical model may include a Stateflow® statechart. A Stateflow® statechart may be used to model a finite state machine in the Stateflow® environment. Nodes in the Stateflow® statechart may represent one or more states in the state machine. Lines in the Stateflow® statechart may represent transitions between the states.

Data-driven graphical models may represent processes which may transform data within a system and may capture how data flows into, out of, and/or within the system. An example of a data-driven graphical model may be a data flow diagram. Nodes in a data flow diagram may represent, for example, entities or processes. Lines in a flow diagram (sometimes represented as arrows) may represent, for example, data flows between entities and/or processes.

In a time-driven graphical model, a simulation or execution of the graphical model may be driven by a clock. Some or all of the nodes of a time-driven graphical model may be sampled for data at regular or irregular time intervals. Nodes in a time-driven graphical model may perform computations on data and generate results from the computations. The results may be output from the nodes as output data. In block diagram models, the nodes may be represented by blocks which may, among other things, perform computations and generate output data. Lines in a time-driven graphical model may represent one or more signals, which may carry data between blocks.

It is worth noting that block diagrams may be used by many different models of computation. For example, in Stateflow® from MathWorks, Inc., flow charts may be represented as block diagrams that may be used to capture behavior of reactive systems and process flow.

During a design of a graphical model, the model may be manipulated through various graphical operations. Graphical operations may include a manipulation of one or more objects (e.g., nodes, lines) in a visual representation of a graphical model, as well as other operations that may be graphically indicated in the modeling environment. For example, a user may specify that data should be provided from one or more source nodes in a model to one or more target nodes in the model by connecting the source nodes and target nodes with one or more lines. However, not every target node may be a valid target for a given source node, or for a given graphical operation in a given modeling environment. A target node may be incompatible with a source node based on data types, sample rates, or other criteria that may be associated with the blocks.

Connecting a source node in a model to an incompatible target node in the model may cause errors. In some models, especially complex models, it may be difficult for a user to identify which target nodes in the model are semantically valid targets for particular source nodes in the model. As a result, it may be difficult to avoid introducing errors in the models, which may be caused by improperly connecting source nodes to incompatible target nodes.

A semantically relevant target may include a target that may be suitable for, or compatible with, a particular source or graphical operation, given the particular semantic context of the source, the target, the graphical operation, and/or a model of which they may be a part. The semantical relevance may vary in degree as an adaptation such as, for example, a data type cast, may be required between the source and target of the connection. The semantical relevance may be further refined based on the functional effect of the adaptation such as, for example, whether the data type case results in loss of information or not and how extensive the loss of information is. A semantically relevant target may be capable of receiving a graphical operation from the source and accurately interpreting information provided by the source. The source and/or target may be nodes.

A semantically relevant target of a source may be identified and highlighted, or semantically irrelevant target of a source may be, for example, diminished or annotated. The identification may account for the degree of semantical relevance, for example, a connection to a target that requires a data type conversion may be highlighted in a different color or annotated differently than a target that does not require a data type conversion or that requires a different data type conversion. The capability to highlight, diminish, annotate, or indicate semantical relevance in another manner may guide a user in choosing semantically relevant choices during a graphical operation, or to group complex and seemingly unrelated items together in response to a query or state.

One or more embodiments may be discussed in connection with graphical block diagram models created and executed in the Simulink® environment (hereinafter "Simulink"). The present invention may be implemented in a number of different applications and embodiments and is not specifically limited in its application to particular embodiments described herein. For example, the present invention is not limited to block diagram models, but rather may be used with other types of models. Furthermore, the present invention is not limited to the particular environments described herein and may be used with other suitable environments.

Graphical models may be models that may include one or more graphical elements. Together the graphical elements may represent a dynamic system. Graphical models may be represented in a graphical programming language, such as a source model language. Examples of source model languages include Simulink and Unified Modeling Language (UML), among others. In some cases, a graphical model may be an executable graphical model or a simulatable graphical model. Execution and simulation will be discussed in more detail below with respect to FIG. 8.

A graphical model may include one or more graphical elements. Graphical elements may include, but are not limited to, textual or graphical annotations, blocks, states, ports, and lines.

Textual or graphical annotations include text or graphics which are added to a graphical model, typically to assist a user or designer in understanding portions of the model. In many cases, textual and graphical annotations do not affect the underlying operation of the graphical model. In other cases, textual annotations may, for example, be formulated in an action language to specify operations performed by the model.

Blocks and states are two examples of nodes. Nodes may generally describe one or more computations, among other things. Nodes may have one or more distinct inputs and/or outputs. The inputs and/or output may be generally referred to as ports.

Nodes may have a semantic meaning; that is, a node may have a particular meaning in the context of the graphical model in which it occurs. In some cases, this semantic meaning may arise from the fact that a node may describe one or more computations. It is also possible for other graphical elements, such as lines, to have semantic meaning. This semantic meaning may vary depending on a context in which a graphical model is employed. For example, graphical models may be provided in a number of different domains, such as time-based block diagrams, event-based statecharts, and data-based data flow diagrams. The semantic meaning of the graphical elements, such as nodes and lines, may be different in each domain.

In time-based block diagrams, lines may represent signal quantities that may vary with time (e.g., data signals) and the nodes are blocks that may represent one or more components of a dynamic system (e.g., components of a controller). The signals may form a time-based dependency between the blocks. The signal quantities may have their computational causality explicitly specified or this causality may be automatically inferred. For example, an equation may prescribe a relation between two variables without explicitly stating the computational causality, or, which of the two variables is computed first. Based on further relations in the model, this causality may be inferred, for example by sorting the equations using a Gaussian elimination scheme.

A semantic behavior in a discrete-event system may differ from a semantic behavior of the time-based model. For example, in a discrete-event system, the lines may represent transitions by which activity status transfers from node to node. Each node in a discrete-event system, which may generally be referred to as a state, may represent an action that may be performed on an entity. Moreover, a state in a discrete-event system may represent a mode of the discrete event-driven system.

A state may be (1) a part of a finite state machine or (2) a statechart that may represent a finite state machine. A statechart may be another example of a graphical model. A statechart may be created in a statechart environment, such as (but not limited to) Stateflow® which is available from MathWorks, Inc. States or statecharts may be embedded and/or referenced in block diagram models.

Another example of a graphical model may be a data flow diagram. In a data flow diagram, blocks may represent operations and lines may represent values or they may represent entity paths by which entities may travel from node to node. The entities may be of different types and may contain one or more attributes that may be of different type. Blocks may be executed based upon data availability.

Another example of a graphical model may be a class diagram. In a class diagram, blocks may represent class and objects and lines may represent relations such as aggregation, association, inheritance, etc. Blocks may contain variables and methods that may be called based on a call graph.

FIG. 1 illustrates portions of a block diagram model 100 that may be created using a diagramming application. The block diagram model 100 is one example of a graphical model that may be used in a time-based domain. The block diagram model 100 may be a graphical entity that may have an "executable meaning". The block diagram model 100 may be used to model a dynamic system. A block diagram model may accept one or more inputs and may generate one or more outputs based on, for example, the inputs, a current state of a system being modeled, and time.

Block diagram models may include one or more graphical elements. Blocks in a block diagram model may be drawn using some form of geometric object (e.g., circle, rectangle, etc.). A block in the block diagram 100 may represent an elemental dynamic system. A block may be an element of a time-based system which may receive inputs, execute functions, perform computations, generate outputs, or carry out a combination of these capabilities or other capabilities. The illustrative block diagram 100 includes a source block 102, a destination block 104, and a block 106.

Ports, such as the input port 108 of the destination block 104 and the output port 110 of the source block 102, may refer to distinct inputs or outputs on a graphical element (such as a block). Ports may be interface ports, flow ports (for example, flow ports from SysML), client-server ports, or other types of ports.

The flow of data through a system may be denoted by lines connecting blocks through ports, and may represent the input and/or output of the system. The lines may be referred to as "signals." A signal may correspond to a time-varying quantity. A signal may be represented by a line connection and may have a particular value at a particular time instant. A line emanating at a first block and terminating at a second block may signify that the output of the first block is an input to the second block. A source block of a signal may write a signal at a given time instant when the source block's equations are solved. A target block of the signal may read the signal when the target block's equations are being solved.

For example, the block diagram 100 is represented schematically as a first collection of graphical elements (in this case, blocks 102, 104, 106) that are interconnected by a set of lines, which represent logical connections between the blocks. In the block diagram 100 a line 112 connects a port 110 of the source block 102 to a port 108 of the destination block 104. Data from the source block 102 may pass to the destination block 104 via the line 112.

Block diagram models may be represented as a series of differential equations. These differential equations may describe a behavior of a dynamic system represented by the block diagram model. Furthermore, a block in a block diagram model may be associated with one or more state variables and one or more equations utilizing the state variables. The equations may define a relationship between the input signals, output signals, state variables, and time for an elemental dynamic system represented by the block. Inherent in the definition of the relationship between the signals and the state variables may be the notion of parameters, which may be coefficients of equations describing the system or individual blocks.

For example, in the block diagram 100 blocks 102, 104, and 106 may each represent an elemental dynamic system, and the relationships between signals and state variables may be defined by sets of equations represented by the blocks 102, 104, 106. Note that the term "block" may not refer exclusively to an elemental dynamic system but may also refer to other modeling elements, such as elements that may be used to aid in readability and/or elements that may be used to aid in the modularity of block diagrams. For example, the term "block" may be used to refer to a virtual block. Virtual blocks are typically used to improve readability of a block diagram. Virtual blocks may differ from certain other types of blocks in that virtual blocks are typically not executed whereas the other types of blocks may be executed.

Also note that the block diagram 100 is merely illustrative of a typical application and is not intended to limit the present invention in any way. For example, blocks may be visually depicted in any geometric shape, and connections between blocks may be made using means other than a line.

Graphical models, such as the graphical block diagram model 100, may be designed in a graphical modeling environment in a model design process. During a model design process, a user may perform a graphical operation in the graphical modeling environment. Graphical operations may include a manipulation of one or more graphical elements (e.g., blocks, lines) in a visual representation of a graphical model, as well as other operations that may be graphically indicated in the modeling environment. For example, a user may connect two or more ports 108, 110 using one or more line segments 112. Connecting two or more ports is one example of a graphical operation. Other examples of graphical operations may include the addition or deletion of graphical elements from the graphical model, and modifying a graphical element (such as a graphical block) using a graphical interface.

Figure 2:
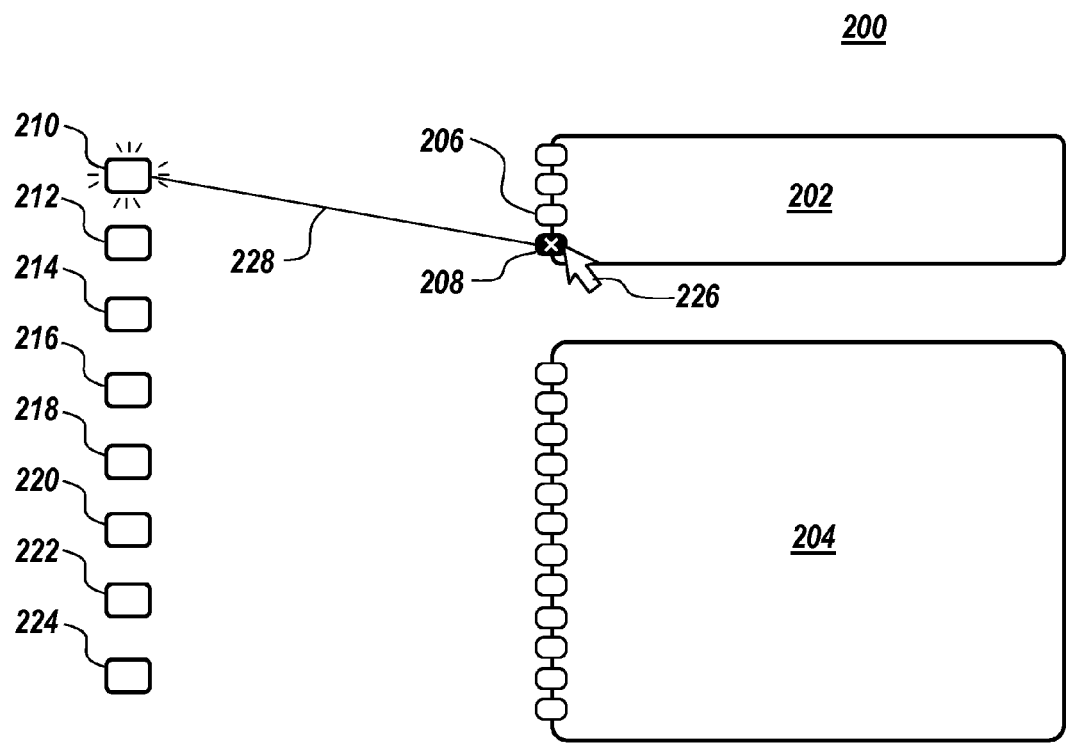
FIG. 2 depicts a graphical model of a system showing an invalid target object for a graphical operation.

Some graphical operations may involve a source and a target. Connecting an input port to an output port using a line is one example of a graphical operation involving a source (the output port) and a target (the input port). For example, FIG. 2 depicts a portion of a block diagram model 200 having two blocks 202, 204. Each block includes a number of ports, such as the input ports 206, 208. There may also be a number of output ports 210-224 in the model. All of the output ports 210-224 may be provided on a single block in the model, or the output ports 210-224 may be divided among different blocks in the model. Alternatively, some or all of the output ports 210-224 may not be associated with any blocks; they may be provided separately from any block in the model.

A graphical operation may be performed on a particular source/target combination. For example, in the graphical model 200 of FIG. 2, output port 210 may output data which may be consumed or processed by destination block 202. Accordingly, a user may wish to connect output port 210 to an input port of the destination block 202 using a line. The user may perform a graphical operation to connect the output port 210 with an input port on destination block 202, for example, using the mouse cursor 226. For example, the user may drag a line 228 from the output port 210 to the input port 208 of the destination block 202 in order to indicate that data from the output port 210 should be used as input of the input port 208.

A particular graphical operation may not necessarily be a semantically relevant option for a specific source/target combination. For example, some graphical operations may require particular types of sources or targets, or both. In addition, some sources may require particular types of targets; thus, a graphical operation that may otherwise be compatible with a particular source may be rendered invalid if, for example, the target of the graphical operation is not compatible with the source. Generally, one or more properties of a source, destination, or graphical operation may determine which combinations of sources, destinations, and graphical operations are compatible.

For example, in FIG. 2 output port 210 may provide output data of a particular data type. A user may wish to provide the data of output port 210 to the block 202 using the input port 208. The user may accordingly attempt to establish a line 228 connecting output port 210 with input port 208 using a graphical operation. However, input port 208 may be set up to receive incoming data of a data type that may be different and/or incompatible with the data supplied by output port 210. Accordingly, input port 208 may not be a valid target for the graphical operation.

As shown in FIG. 2, the user has selected output port 210 and moved the cursor 226 to the desired input port 208. However, because, as noted above, input port 208 is not a valid target for the graphical operation an error occurs when the input port 208 is identified as a target for the graphical operation. This error may be reflected by changing a visual representation of input port 208 to show that input port 208 is incompatible with the graphical operation. For example, in FIG. 2, input port 208 is changed to display an "X." Alternatively, color, size, shape, or some other feature of input port 208 could be changed, and/or a message (e.g., a pop-up message) that may describe the incompatibility may appear. Numerous visual cues may be employed to indicate the incompatibility. The incompatibility may be indicated on the input port 208, the line 228, the output port 210, and by another indicator. In another alternative, an expected change of some feature of input port 208 or of the line 228 may not occur. For example, an open arrow head that would change to solid when input port 208 is a valid target may not occur.

In FIG. 2, input port 208 may be set up to receive incoming data of a data type that may be different from the data supplied by output port 210 but that can be converted by a data type cast (for example, an integer to a double). Accordingly, input port 208 may be a valid target for the graphical operation but with a lesser degree of compatibility. Alternatively, the data type cast may lose information (for example, a double to an integer). Accordingly, input port 208 may be a valid target for the graphical operation but with a yet lesser degree of compatibility. This degree of compatibility may be reflected by changing a visual representation of input port 208, line 228, output port 210, and by another indicator. For example, a color attribute such as 'red' in the RGB encoding may vary across a given range of 0 to 255 according to a degree of compatibility. Alternatively, annotations may indicate the adaptation required.

The degree of compatibility may be of a partial order, for example, when the incoming data type is composed of two data types, one of which may require a data type conversion when data for input port 208 is supplied by output port 210 and the other of which may require a data type conversion when data for input port 206 is supplied by output port 210. In case the two data type conversions are different, the information about the partial ordering may be indicated, for example, by a pop up annotation on the graphical model. Alternatively, a metric over the two data type conversions may be supplied (for example, a conversion from Boolean to integer contributes less to the degree of compatibility than a conversion from integer to double) to create a total order.

In FIG. 2, an incompatibility may be shown when the user identifies the intended target of the graphical operation (e.g., when the user "mouses over" the input port 208 with the cursor 226). In some circumstances, it may be desirable to identify one or more valid potential targets for a graphical operation after a source of the graphical operation and/or the graphical operation itself has been identified. For example, it may be cumbersome to require that a user identify a particular target before that target is identified as valid or invalid. In some cases, it may be desirable to identify some or all valid targets for a graphical operation after the graphical operation and/or source is identified. Visual cues may provide an indication of compatibility.

Although, as indicated in FIG. 2, input port 208 is not a valid target for the graphical operation (i.e., connecting output port 210 using a line 228), a different input port 206 may be compatible with the graphical operation. One or more valid targets may be determined after the source is selected and/or the graphical operation is identified, based on the properties of the source and/or the graphical operation.

In one embodiment, the source and target ports associate with variables of constraints. These constraints may be non-causal equations such as in models of physical systems. For example, Ohm's Law states that the voltage drop, V, across a resistance equals the current, I, through the resistance times the resistance value, R, or V=R*I. This equation does not state its causality, i.e., whether V is computed from I or I from V, which depends on how the resistance is connected. The causality can be inferred automatically from the resistance connections.

In another embodiment, the ports may not be shown as graphical elements, for example, in the case of a state transition diagram or a class diagram. The source and target block may behave similar to the port behavior description.

Figure 3:
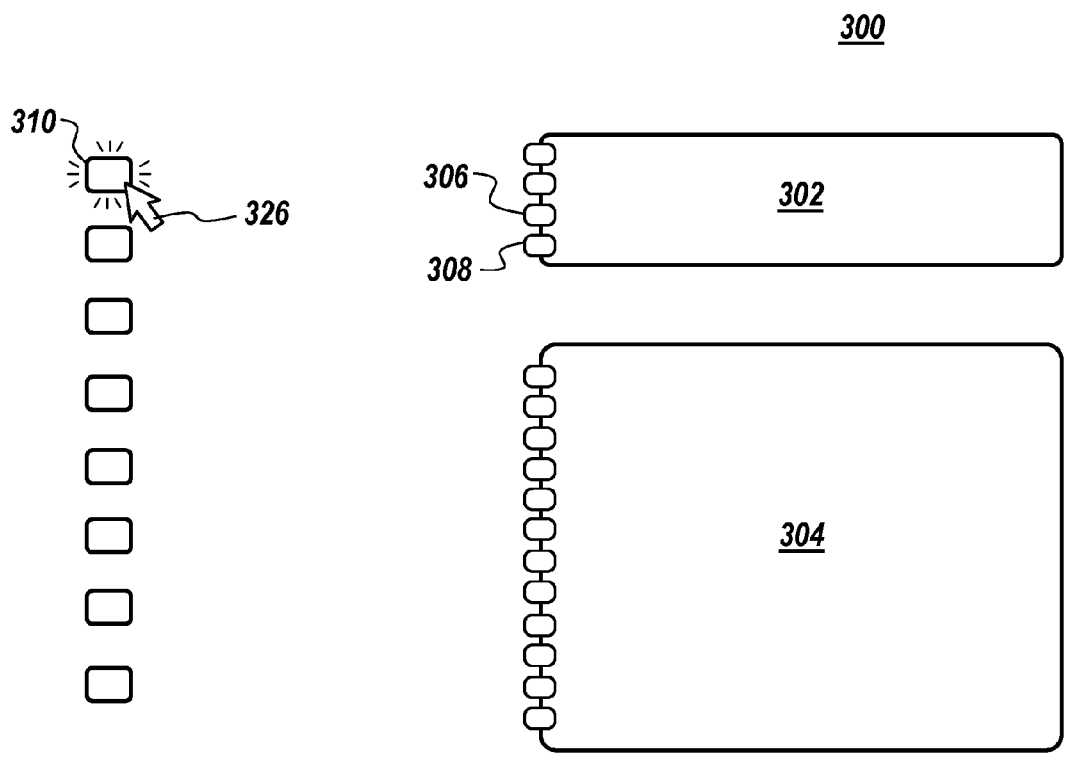
FIG. 3 depicts a graphical model of a system after a selection of a source object for a graphical operation.

One or more valid targets may be determined before a user selects a target or a group of targets. A user may select one or more potential targets, and one or more valid targets may be identified from among the selected potential targets. FIG. 3 is an example of an initial selection of a source for a graphical operation, from which one or more semantically relevant targets may be identified. In contrast to FIG. 2, the procedure shown in FIGS. 3-4 may be performed before the user identifies one or more targets for the graphical operation.

In FIG. 3, a graphical model of a system 300 includes destination blocks 302, 304. Destination block 302 includes input ports 306, 308. A user may wish to connect an output port 310 with one or more input ports of the destination block 302, but may not know which input ports are valid targets. Referring to FIG. 3, the user may select output port 310 to indicate this port 310 is an intended source of a graphical operation. The selection may be accomplished by moving the cursor 326 to the location of the output port 310 on a visual display of the graphical model 300 and clicking on the output port 310. Alternatively, a selection may be received in some other way. For example, a selection could be indicated by keyboard input, hovering the cursor 326 over the port 310 for a certain period of time, voice commands, by dragging a rectangle around the port 310 with the cursor 326, or some other way.

Figure 4:
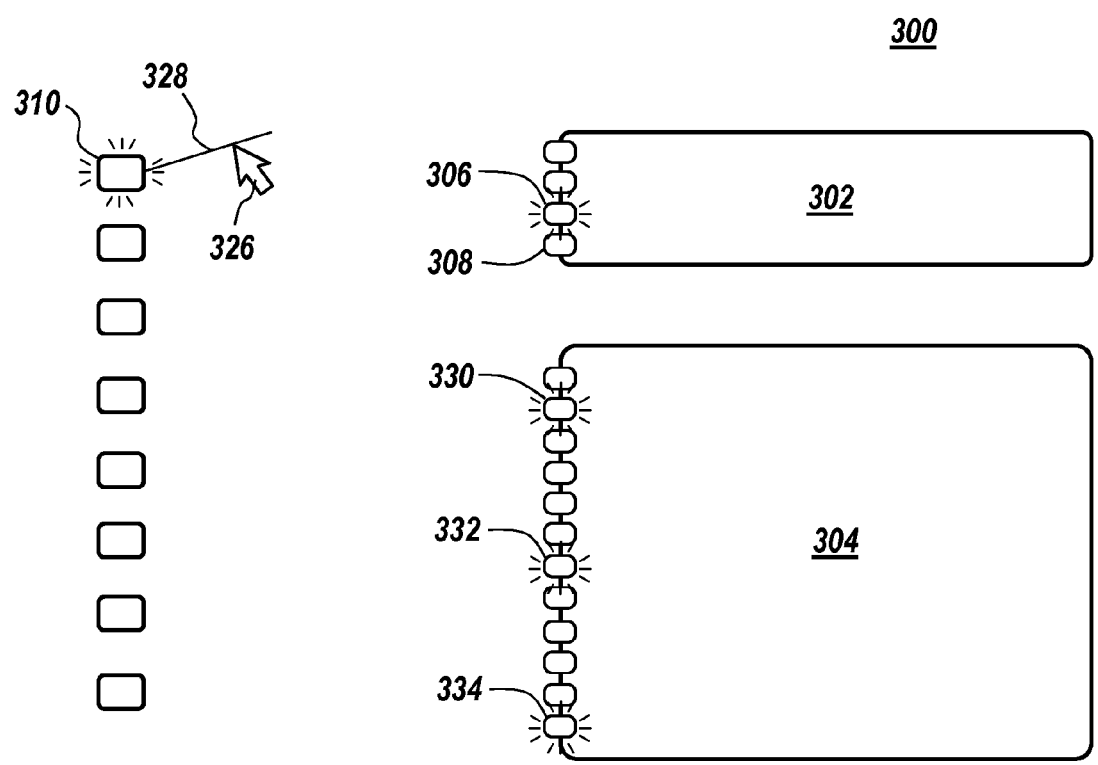
FIG. 4 depicts a graphical model of a system with semantically relevant target objects highlighted.

FIG. 4 depicts an example of a graphical operation in a graphical model of a system in which semantically relevant target blocks are highlighted and semantically irrelevant target blocks are diminished.

The graphical model depicted in FIG. 4 includes a number of graphical elements. Examples of graphical elements include the blocks 302 and 304 and the ports 306, 308, 310, 330, 332, and 334. FIG. 4 depicts the graphical model of FIG. 3 immediately after a user has selected the source port 310 and begun to drag the cursor 326 to create a line 328 extending from the source port 310.

In some graphical modeling environments, selecting a node and dragging the cursor 326 may signify an initiation of a graphical operation. For example, a graphical operation may involve providing a signal from port 310 to a target. Here, selecting port 310 and dragging cursor 326 in an outward direction from port 310 may cause line 328 to be drawn. Line 328 may represent the signal that may be provided by port 310. At the time that the cursor 326 is initially dragged, as shown in FIG. 4, a target for the signal may not yet be identified.

A graphical operation may require a semantically valid target. A semantically valid target may include a target that is semantically compatible with a particular source or graphical operation, given the particular semantic context of the source, target, graphical operation, and/or the model of which they are a part. A semantically valid target may be capable of receiving the graphical operation from the source and accurately interpreting information provided by the source.

A graphical operation may establish a relationship between a source and a target. Relationships may include logical connections between a source and a target which may allow the source to affect the target, or vice-versa. A relationship may be graphically represented in the graphical model, for example, by a line that may connect the source to the target. Examples of relationships may include, but are not limited to, one-way data sharing, two-way data sharing, signals, transitions, and other relationships that may allow for manipulation of data between two or more graphical elements in a graphical model.

The graphical operation depicted in FIG. 4 may be a drag-and-drop action that may involve dragging cursor 326 from a first graphical element (in this case, source port 310) and dropping the first graphical element onto a second graphical element to establish a relationship between the first graphical element and the second graphical element. The dragging may be accomplished by moving mouse cursor 326 away from the source port 310 while depressing a mouse button.

It should be noted that, while the graphical operation in this case may include dragging and dropping, at the point in time shown in FIG. 4, the cursor 326 is being dragged but has not yet been dropped. "Dropping" may be accomplished by releasing the mouse button when the cursor 326 is over an intended target. Because the cursor 326 has not yet been dropped, the graphical operation depicted in FIG. 4 has been initiated, but is not yet completed.

Other graphical operations are also possible and may be initiated in a number of different ways. For example, a graphical operation may be initiated using keyboard input, right clicking on graphical element, using a voice command, rotating a mouse wheel, and/or some other way of initiating a graphical operation.

After identifying the graphical operation, the semantically relevant targets 306, 330, 332, 334 of the graphical operation may be programmatically identified. The identification of semantically valid targets will be discussed in more detail with respect to FIG. 5, below. After the semantically valid targets 306, 330, 332, 334 are programmatically identified, the semantically valid targets 306, 330, 332, 334 may be highlighted. Note that highlighting a semantically valid target is only one way to identify the semantically valid target. Other ways of identifying a target as semantically valid may be used. For example, the target may be identified as semantically valid by changing the target's color, flashing the target on a display, surrounding the target using a visual cue, using arrows to point out the target, providing a pop-up textual annotation, or some other technique may be used for identifying the target as semantically valid. Note that one or more auditory cues regarding semantically valid targets may also be provided. In addition, semantically invalid or irrelevant targets may be graphically diminished. For example, port 408 may be dimmed to indicate that it is an invalid or irrelevant target given the above graphical operation.

After the semantically valid targets 306, 330, 332, 334 have been identified, the user may choose one or more targets for the graphical operation. In the example depicted in FIG. 4, the user may move the cursor 326 over a target and release the mouse button, thus dropping the cursor 326 and completing the drag and drop operation. Other means of specifying a target may also be used, including keyboard input, voice commands, rotating a mouse wheel, and left clicking or right clicking the target, among other options.

When the targets for the graphical operation are identified, the graphical operation may be performed. Performing the graphical operation may cause a relationship to be established between the source graphical element (e.g., the source port 410) and the target graphical element. The relationship may be indicated by a graphical connection that connects the source graphical element with the target graphical element, such as a line between the source graphical element and the target graphical element.

The user may identify one or more sources of a graphical operation, and one or more targets of a graphical operation. If one source and one target are identified, the graphical operation may be referred to as a "one-to-one" graphical operation. If multiple sources and one target are identified, the graphical operation may be referred to as a "many-to-one" graphical operation. If a single source is identified and multiple targets are identified, the graphical operation may be referred to as a "one-to-many" graphical operation. If multiple sources and multiple targets are identified, the graphical operation may be referred to as a "many-to-many" graphical operation. The graphical operation may establish a relationship between any semantically valid combination of sources and targets.

If multiple sources are selected, the identified semantically valid targets may be identified so that each identified target may be a semantically valid target for all of the sources. Alternatively, the identified semantically valid targets may each be a semantically valid target for at least one of the identified sources.

If a user identifies a target of a graphical operation and signifies that more targets are desired (e.g., establishing a one-to-many or many-to-many relationship), then the remaining semantically valid targets may be identified. More, fewer, or the same number of semantically valid targets may be compatible with the source, graphical operation, and the targets which have already been identified.

Figure 5A:
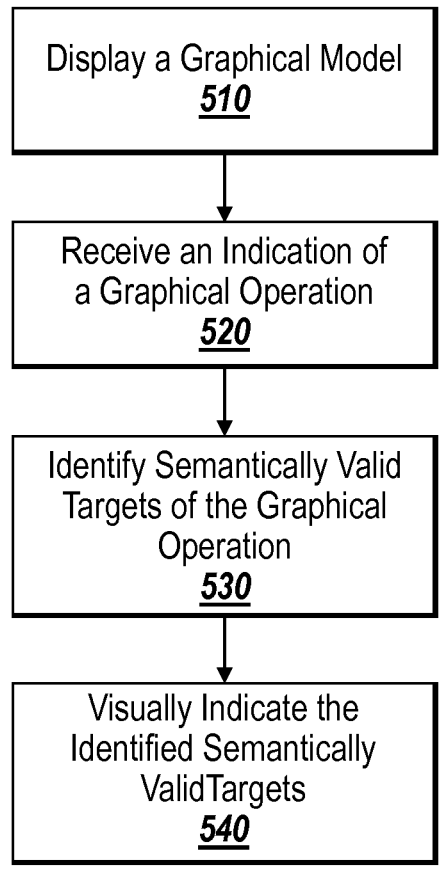
FIG. 5A is a flow chart visually depicting exemplary acts that may be used to emphasize semantically relevant concepts in a graphical model of a system.

FIG. 5A is a flow chart of example acts that may be performed by an electronic device for emphasizing semantically relevant concepts in a graphical model of a system.

At block 510, a plurality of graphical elements of a graphical model may be displayed, for example, on a display device. The graphical model may be displayed by a graphical modeling environment. The displayed graphical model may be a graphical block diagram model. The graphical elements may include one or more nodes such as blocks or states, lines, ports, or other graphical elements.

At 520, an indication of a graphical operation is received. The indication may include receiving a selection of a first graphical element to be used in the graphical operation. The first graphical element may be either a source graphical element, or a target graphical element. Alternatively, a user may select a graphical operation from a menu, may indicate a graphical operation using keyboard input, or may use a mouse wheel to select a graphical operation. In other embodiments, the indication may include a mouse button event (such as a mouse button down event), hovering a cursor over the first graphical element, employing a voice command to indicate that a graphical operation should be initiated, the initiation of a drag and drop operation, and/or other indications indicating that a graphical operation should be initiated.

Note that the graphical operation may involve connecting a source graphical element to a target graphical element using, for example, a line or establishing some other relationship between the source graphical element and the target graphical element. For example, performing the graphical operation may cause a relationship to be established between the source graphical element and one or more other target graphical elements that are compatible with the graphical operation and/or the source graphical element. However, it should be noted that the graphical operation need not be performed at this stage; rather, only an indication of the graphical operation is received. At block 530, one or more target graphical elements of the plurality of graphical elements are identified. The one or more identified target graphical elements may be semantically valid targets of the graphical operation in that the identified target graphical elements may be compatible with the graphical operation and one or more characteristics associated with the source graphical element.

The graphical operation may be an editing operation, such as an addition or removal of a graphical element to or from the graphical model. Semantically valid targets may be identified based on an identity of the editing operation. For example, targets which may properly be edited by the editing operation may be identified as semantically valid. The identity of the editing operation may be determined based on a user input. Furthermore, the identity of the editing operation may be determined after receiving the selection of a source graphical element.

Alternatively, the semantically relevant targets of the graphical action may be identified based on one or more properties of the source graphical element, one or more properties of the graphical operation, one or more properties of data associated with the source graphical element or the graphical operation, or a combination of properties. For example, the semantically valid targets may be identified based on one or more properties of the potential targets that may be compatible with one or more properties of the source graphical element.

Examples of properties may include sample rates, data types, block types, block properties, relationship properties, value ranges, sample times, dimensions, complexity, physical domains, communication protocols, and/or user-defined properties. Properties may be associated with, among other things, blocks, ports, lines, data, and graphical operations. The properties of a block may affect the dynamics of the model using the block. One or more properties may be specified for one or more input ports of the block, one or more output ports of the block, and/or the block as a whole. Examples of block properties are depicted in FIG. 5B.

Block properties 550 include block sample times 552 and restrictive flags 554. Block sample times 552 may specify whether the block corresponds to an elemental, continuous, discrete, or hybrid dynamic system. If the block is an elemental discrete-time system, then the block sample times 552 may specify a spacing between time instants at which a block response should be traced. A restrictive flag 554 may disallow a use of blocks in certain modeling contexts. For example, the restrictive flag 554 may be used to impose a restriction that there be only one instance of a given block in a model.

Block port properties 560 may specify one or more properties of data that may either be available or produced at a particular port. Block port properties 560 include dimension attributes 562, datatypes 564, sample rates 566, complexity attributes 568, unit attributes 570, physical domain attributes 572, and communication protocol attributes 574. Dimension attributes 562 may include individual dimensions of a multi-dimensional matrix that may be used as a container for data elements. Datatype attributes 564 may include a datatype of an element of data in the data container. A sample rate attribute 566 may specify how a signal corresponding to an input or output port may be used. A complexity attribute 568 may be a flag that may be used to specify whether a data element is real or complex. A unit attribute 570 may include a unit of an element of data in the data container such as, for example, a Système international d'unités (SI) unit. A physical domain attribute 572 may identify whether a port represents a mechanical, electrical, hydraulic, pneumatic, thermal, volume flow, etc., connection or whether the variables of a port are, for example, across variables, through variables, efforts, flows, voltages, currents, forces, displacements, charges, etc. A communication protocol attribute 574 may be identify whether a communication is based on, for example, a publish/subscribe, broadcast, multicast, or point-to-point protocol.

The properties may be identified based on a field associated with a block. For example, a source port may be defined with a "type" field. Ports having the same type field or another compatible type field may be suitable for connection to the source port.

Further, if data is provided as a part of the graphical operation or as a consequence of the graphical operation, data properties 580 may determine compatibility between sources, targets, and graphical operations. Examples of data properties 580 that may be used to determine compatibility may include data types 582, value ranges 584, and data dimensionality 586.

Referring back to FIG. 5A, at block 540, the identified semantically valid graphical elements are visually indicated to be compatible with the graphical operation on the display device. The visual appearance of the semantically valid graphical elements may be changed in some way. For example, the semantically valid graphical elements may be highlighted, valid graphical elements may change color, flash, vibrate and/or move, may be surrounded by a visual cue, a pop up textual annotation may appear, and/or arrows may be shown pointing to the semantically valid targets, among other possibilities. Auditory cues regarding semantically valid targets may also be provided. Moreover, semantically invalid or irrelevant targets may be indicated as such on the display device by, for example, graphically diminishing their visual appearance on the display device.

The visual indication, at block 540, may be provided after the indication of a graphical operation is received at block 520, but before the graphical operation is actually performed. For example, the visual indication may be provided before the drop portion of a drag and drop operation is performed. Likewise, for example, the visual indication may be provided before the user identifies a target or a group of targets for the graphical operation.

If multiple graphical elements are identified as being suitable for the graphical operation, the visual indication may indicate that each of the identified graphical elements is suitable for the graphical operation.

Figure 5C:
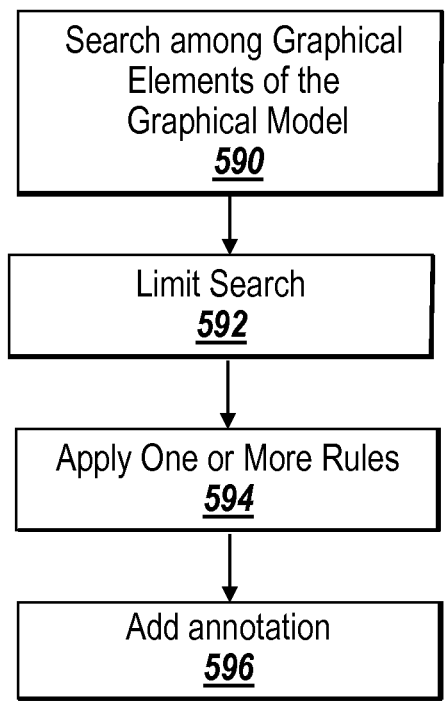
FIG. 5C depicts act 530 of FIG. 5A in more detail.

As noted above, semantically valid targets may be identified at block 530. FIG. 5C depicts block 530 of FIG. 5A in more detail.

Referring to FIG. 5C, at block 590, the identification of the semantically valid targets may include searching among the graphical elements of the model. The search may include, for example, searching the fields and/or properties of the graphical elements for one or more properties that are compatible with one or more properties of the source graphical element.

At block 592 the search of the plurality of graphical elements may be limited based on, for example, a proximity of the source graphical element to a searched element on the display device. Here, graphical elements which are near the source graphical element, in a visual representation of the graphical model on a display device, may be searched. For example, the searched graphical elements may be adjacent to the source graphical element, with no graphical elements between the source graphical element(s) and the searched graphical element. Alternatively, the searched graphical elements may be separated from the source graphical element by a predetermined number of graphical elements. The searched graphical elements may be a predetermined distance away from the source graphical elements, such as a predetermined number of pixels on the visual representation. Alternatively, the search may begin with one or more graphical elements which may be closest to the source graphical element in the visual representation and semantically valid targets may be presented to a user as they are identified in the search. The search may be limited based on spatial rules and/or semantic rules. Alternatively, the search may exclude model elements that are related to the source graphical elements by a number of interspersed model elements that is less than or greater than a certain value.

At block 594, the identification of the semantically valid targets may be performed based on one or more rules. The rules, may be, for example, Object Constraint Language (OCL) rules, among other possibilities. The rules may relate one or more properties of the source graphical element and/or the graphical operation to one or more properties of the potential targets. The rules may specify that a given property or range of properties may be required to make a potential target a semantically valid target. The rules may also specify that the presence of a particular property in a potential target may render the potential target semantically invalid for the graphical operation.

One or more of the rules may be established or configured by a user. For example, a user interface for adding one or more rules may be provided. The user interface may allow a user to specify a condition upon which a target will be deemed valid or invalid. The condition may be associated with one or more properties of a source, a graphical operation, or a target. The rules may be used in various combinations. For example, two or more rules may be used in conjunction with one another (e.g., Rule A and Rule B must both be satisfied in order for a potential target to be semantically valid or invalid). Alternatively, two or more rules may be used in the alternative (e.g., a potential target is semantically valid or invalid if either of Rule A or Rule B is satisfied). The rules may be written as positive conditions (e.g., Rule A states that an Action N is taken if Condition C is satisfied) or as negative conditions (e.g., Rule A states that an Action N is taken if Condition C is not satisfied).

A library of rules, including default rules and user defined rules, may be presented in an interface and a user may select which of the rules to apply.

At block 596 an annotation may be added to the model that may show why certain targets are semantically valid or invalid. The annotation may identify, for example, which rules were satisfied and/or violated by the target. In one embodiment, the annotation may be a warning message that indicates why a target is not semantically valid, and suggests changes that could make the target semantically valid. Alternatively, the warning message may indicate when a particular variable will be cast into another type in order to complete the graphical operation, which may result in the loss of information.

A graphical operation (such as an editing operation) may be changed before the user identifies a target or group of targets, or attempts to resolve the operation by establishing a relationship. Here, a new group of semantically valid targets may be identified based on the new graphical operation. Such an example is shown in FIGS. 6-7.

Figure 6:
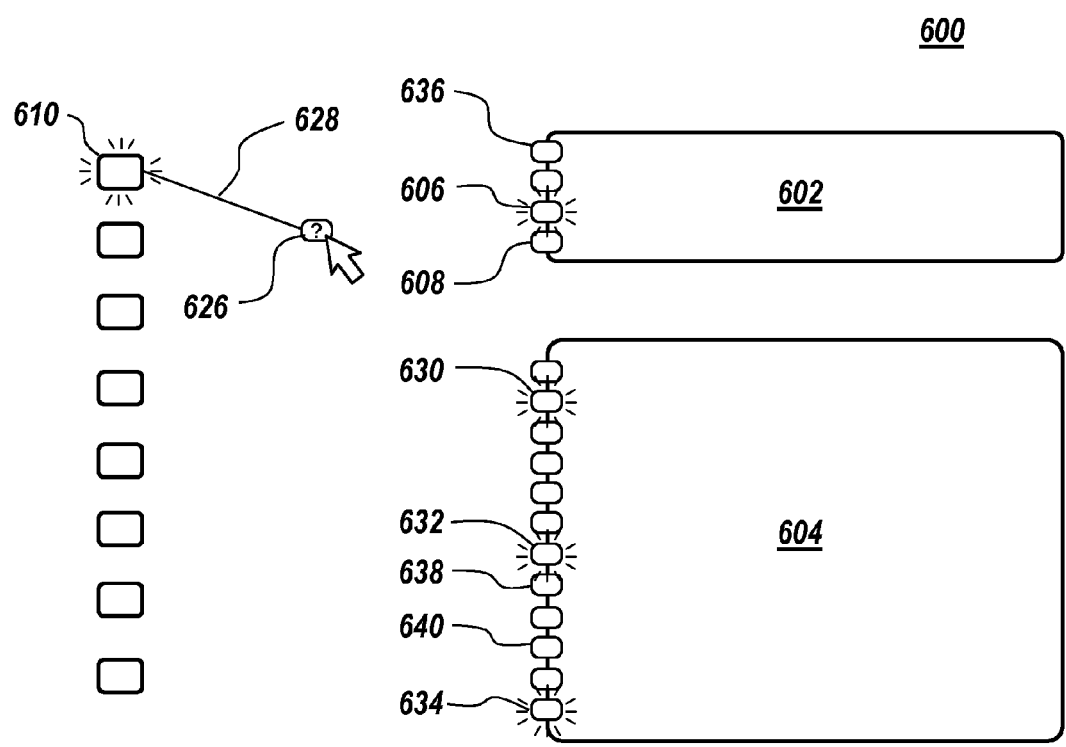
FIG. 6 depicts a graphical model of a system performing a graphical operation that may involve querying for semantically relevant target objects.
Figure 7:
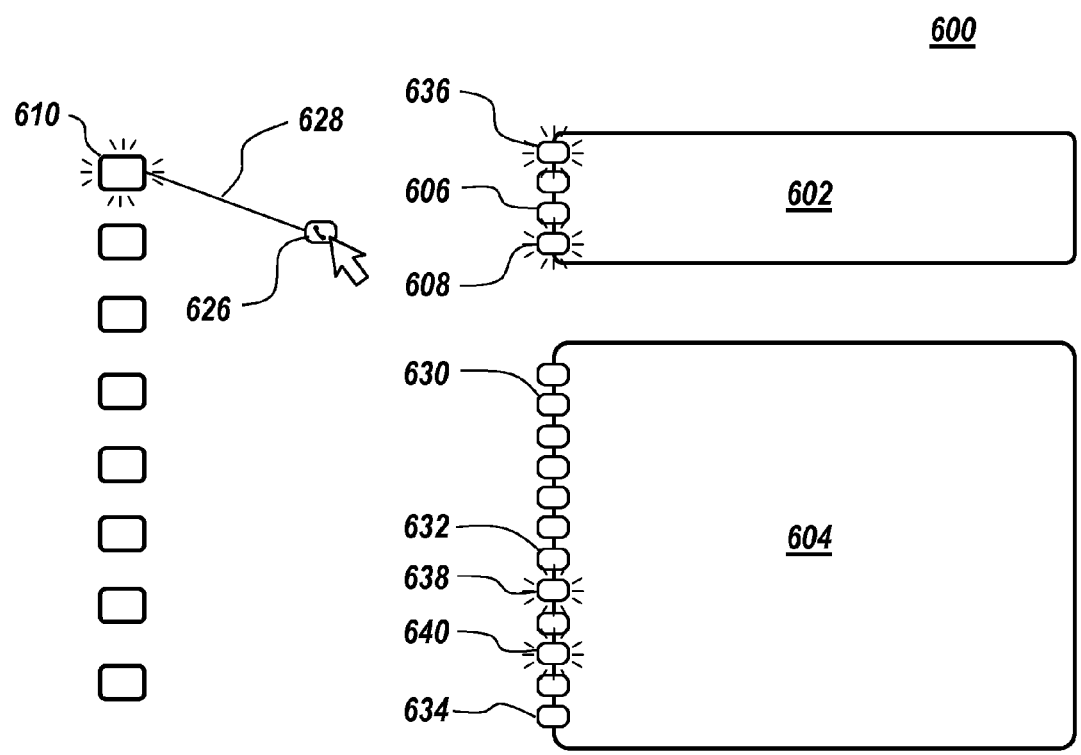
FIG. 7 depicts the graphical model of a system of FIG. 6, where the type of graphical operation is changed during a selection process.

FIG. 6 depicts a graphical model of a system 600 in which a user is performing a graphical operation that queries for semantically relevant target blocks. In the graphical model 600, two graphical blocks 602, 604 are provided. The first graphical block 602 includes a number of ports, including input ports 606, 608, and 636. The second graphical 604 block also includes a number of ports, including input ports 630, 632, 634, and 640. In the example depicted in FIG. 6, a user wishes to perform a graphical operation with respect to an output port 610. Accordingly, the user has selected the output port 610 using the cursor 626.

In FIG. 6, the user has identified the graphical operation as a query operation. The cursor 626 is visually changed to reflect an identity of the selected operation. In this case, the icon representing the cursor 626 has changed to a query icon.

The graphical operation in FIG. 6 is accomplished through a drag and drop operation. A line 628 appears to indicate that the cursor 626 is being dragged, but has not yet been dropped. When the cursor 626 is dropped, a new line will be established connecting the source output port 610 to a semantically valid target.

Semantically valid targets for a query operation are identified and highlighted in FIG. 6. For example, semantically valid targets of the query operation may include input ports 606, 630, 632, and 634. Input ports 608, 636, 638, and 640 may be among semantically invalid targets, and their appearance may thus remain unchanged. Alternatively, the appearance of the semantically valid targets 606, 630, 632, and 634 may remain unchanged, while the appearance of the semantically invalid targets 608, 636, 638, and 640 may be changed.

In FIG. 7, the user has changed the graphical operation to be performed. In this case, the user has indicated that a call operation should be performed instead of a query operation. Such a change may be made, for example, after the output port 610 is selected but before the query operation is performed or a relationship between the output port 610 and a target is established.

In one example, the graphical operation is accomplished through a drag and drop operation. The type of graphical operation may be changed while the user is dragging the cursor but before the user drops the cursor (for example, by releasing a mouse button).

The change in the type of graphical operation may be accomplished via keyboard input (for example, pressing the CTRL key on the keyboard), by rotating a mouse wheel, using a voice command, by shaking the mouse, or by any other suitable technique.

Figure 8A:
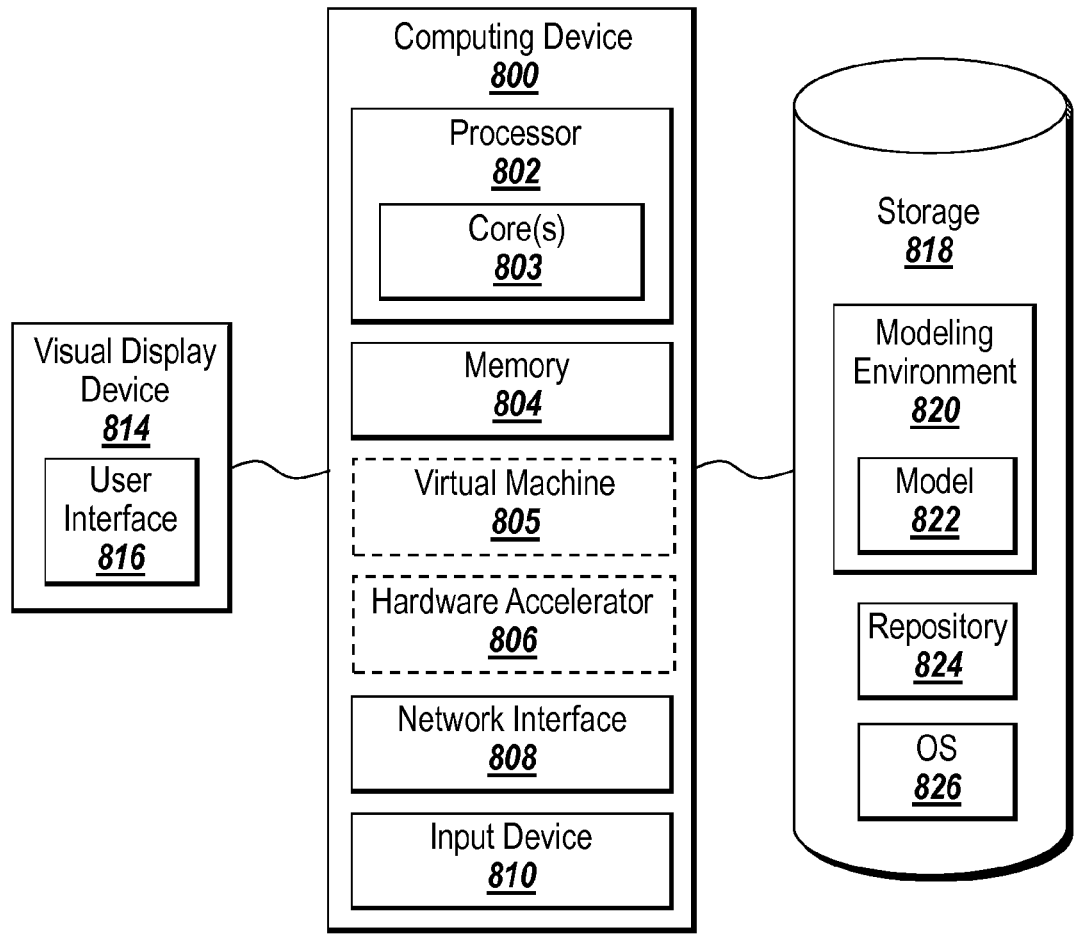
FIG. 8A depicts an electronic device that may be suitable for use with the one or more embodiments disclosed herein.

One or more of the above-described acts may be encoded as computer-executable instructions executable by processing logic. The computer-executable instructions may be stored on one or more non-transitory computer readable media. One or more of the above described acts may be performed in a suitably-programmed electronic device. FIG. 8A depicts an electronic computing device 800 that may be suitable for use with one or more acts disclosed herein.

The computing device 800 may take many forms, including but not limited to a computer, workstation, server, network computer, quantum computer, optical computer, Internet appliance, mobile device, a pager, a tablet computer, a smart sensor, application specific processing device, etc.

The computing device 800 depicted in FIG. 8A is illustrative and may take other forms. For example, an alternative implementation of the computing device 800 may have fewer components, more components, or components that are in a configuration that differs from the configuration of FIG. 8A. The components of FIG. 8A and/or other figures described herein may be implemented using hardware based logic, software based logic and/or logic that is a combination of hardware and software based logic (e.g., hybrid logic); therefore, components illustrated in FIG. 8A and/or other figures are not limited to a specific type of logic.

The processor 802 may include hardware or software based logic to execute instructions on behalf of the computing device 800. In one implementation, the processor 802 may include one or more processors, such as a microprocessor. In one implementation, the processor 802 may include hardware, such as a digital signal processor (DSP), a field programmable gate array (FPGA), a Graphics Processing Unit (GPU), an application specific integrated circuit (ASIC), a general-purpose processor (GPP), etc., on which at least a part of applications can be executed. In another implementation, the processor 802 may include single or multiple cores 803 for executing software stored in a memory 804, or other programs for controlling the computing device 800.

The computing device 800 may include one or more tangible non-transitory computer-readable storage media for storing one or more computer-executable instructions or software that may implement one or more embodiments of the invention. The memory 804 may include a computer system memory or random access memory (RAM), such as dynamic RAM (DRAM), static RAM (SRAM), extended data out RAM (EDO RAM), etc. The memory 804 may include other types of memory as well, or combinations thereof.

One or more processors 802 may include virtual machine (VM) 805 for executing the instructions loaded in the memory 804. A virtual machine 805 may be provided to handle a process running on multiple processors so that the process may appear to be using only one computing resource rather than multiple computing resources. Virtualization may be employed in the computing device 800 so that infrastructure and resources in the computing device may be shared dynamically. Multiple VMs 805 may be resident on a single processor 802.

A hardware accelerator 806, may be implemented in an ASIC, FPGA, or some other device. Hardware accelerator 806 may be used to speed up the general processing rate of the computing device 800.

The computing device 800 may include a network interface 808 to interface to a Local Area Network (LAN), Wide Area Network (WAN) or the Internet through a variety of connections including, but not limited to, standard telephone lines, LAN or WAN links (e.g., T1, T3, 56 kb, X.25), broadband connections (e.g., integrated services digital network (ISDN), Frame Relay, asynchronous transfer mode (ATM), wireless connections (e.g., 802.11), high-speed interconnects (e.g., InfiniBand, gigabit Ethernet, Myrinet) or some combination of any or all of the above. The network interface 808 may include a built-in network adapter, network interface card, personal computer memory card international association (PCMCIA) network card, card bus network adapter, wireless network adapter, universal serial bus (USB) network adapter, modem or any other device suitable for interfacing the computing device 800 to any type of network capable of communication and performing the operations described herein.

The computing device 800 may include one or more input devices 810, such as a keyboard, a multi-point touch interface, a pointing device (e.g., a mouse), a gyroscope, an accelerometer, a haptic device, a tactile device, a neural device, a microphone, or a camera, that may be used to receive input from, for example, a user. Note that computing device 800 may include other suitable I/O peripherals.

The input devices 810 may be allow a user to provide input that is registered on a visual display device 814. A graphical user interface (GUI) 816 may be shown on the display device 814.

A storage device 818 may also be associated with the computer 800. The storage device 818 may be, for example, a hard-drive, CD-ROM or DVD, Zip Drive, tape drive, or other suitable tangible computer readable storage medium capable of storing information. The storage device 818 may be useful for storing application software programs, such as a modeling application or environment 820 (which may be, for example the Simulink® environment) including a model 822, and for storing a repository 824 and an operating system (OS). Note that the software programs may include computer-executable instructions that may implement one or more embodiments of the invention.

The computing device 800 can be running an operating system (OS) 826. Examples of OS 826 may include the Microsoft® Windows® operating systems, the Unix and Linux operating systems, the MacOS® for Macintosh computers, an embedded operating system, such as the Symbian OS, a real-time operating system, an open source operating system, a proprietary operating system, operating systems for mobile computing devices, or other operating system capable of running on the computing device and performing the operations described herein. The operating system may be running in native mode or emulated mode.

One or more embodiments of the invention may be implemented using computer-executable instructions and/or data that may be embodied on one or more non-transitory tangible computer-readable mediums. The mediums may be, but are not limited to, a hard disk, a compact disc, a digital versatile disc, a flash memory card, a Programmable Read Only Memory (PROM), a Random Access Memory (RAM), a Read Only Memory (ROM), Magnetoresistive Random Access Memory (MRAM), a magnetic tape, or other computer-readable media.

One or more embodiments of the invention may be implemented in a programming language. Some examples of languages that may be used include, but are not limited to, Python, C, C++, C#, Java, Javascript, a hardware description language (HDL), unified modeling language (UML), and Programmable Logic Controller (PLC) languages. Further, one or more embodiments of the invention may be implemented in a hardware description language or other language that may allow prescribing computation. One or more embodiments of the invention may be stored on or in one or more mediums as object code. Instructions that may implement one or more embodiments of the invention may be executed by one or more processors. Portions of the invention may be in instructions that execute on one or more hardware components other than a processor.

Figure 8B:
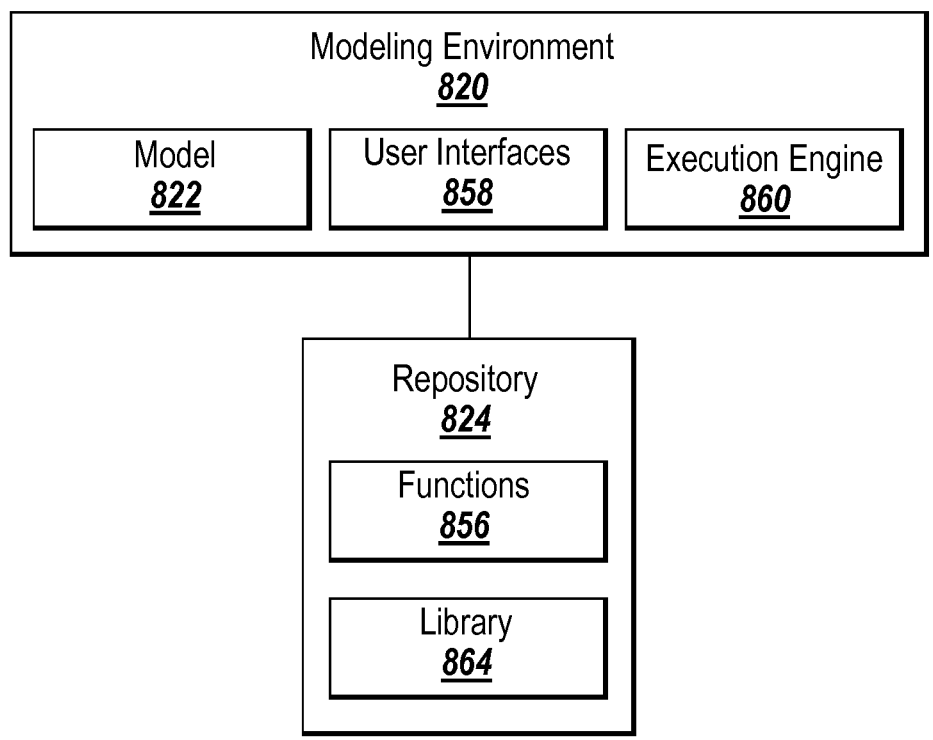
FIG. 8B depicts a modeling environment that may be suitable for use with one or more embodiments disclosed herein.

FIG. 8B depicts modeling environment 820 and repository 824 of FIG. 8A in more detail. The modeling environment 820 may include an editor, which may allow a user to create and modify a block diagram model representing a dynamic system.

The modeling environment 820 may also allow a user to create and store data relating to graphical entities. The modeling environment may include a textual interface that supports a set of commands that may allow interaction with the editor. Using this textual interface, the user may write special scripts that may perform automatic editing operations on a block diagram of a model. The user may interact with one or more windows that may act as canvases for the model. The model may be partitioned into multiple hierarchical levels through the use of subsystems and different levels of the model's hierarchy may be displayed in different canvases.

One or more interface tools within the modeling environment 820 may be used by a user to create a block diagram model. For example, the interface tools may include a block palette, a wiring line connection tool, an annotation tool, a formatting tool, an attribute editing tool, a save/load tool and a publishing tool. The block palette may include a library of pre-defined blocks that may be available to the user for building the block diagram. The palette may be customized by the user to: (a) reorganize one or more blocks in some custom format, (b) delete one or more blocks, and/or (c) add one or more custom blocks that the user may have designed. The palette may allow one or more blocks to be dragged using a human-machine interface (such as a mouse or keyboard) from the palette on to a canvas that may be displayed in a window.

The modeling environment 820 may run under the control of an operating system, such as OS 826. The modeling environment 820 may enable, for example, a user to build and execute a model 852 of a system. The modeling environment 820 may include a text-based modeling environment, a graphical modeling environment, or some other modeling environment. Examples of modeling environments that may implement one or more embodiments of the invention may include MATLAB® and Simulink®, Stateflow®, Simscape™, and SimMechanics™ which are available from The MathWorks, Inc.; LabVIEW® or MATRIXx available from National Instruments, Inc; Mathematica® available from Wolfram Research, Inc.; Mathcad available from Mathsoft Engineering & Education Inc.; Maple™ available from Maplesoft, a division of Waterloo Maple Inc.; Poseidon for UML by Gentleware, AG of Hamburg, Germany; MagicDraw by NoMagic, Inc., of Plano, Texas; Comsol available from Comsol AB of Sweden; Scilab™ available from The French National Institution for Research in Computer Science and Control (INRIA), Le Chesnay Cedex, France; and GNU Octave, available from the GNU Project; SoftWIRE available from Measurement Computing; VisSim available from Visual Solutions; WiT available from DALSA Coreco; VEE Pro available from Agilent; Dymola available from Dynasim AB; Extend available from Imagine That, Inc.; Scicos available from The French National Institution for Research in Computer Science and Control (INRIA); MSC.Adams® available from MSC.Software Corporation; Rhapsody® and Rational® available from International Business Machines Corporation; ARTiSAN Studio available from ARTiSAN Software Tools, Inc.; and SCADE™ from Esterel Technologies, Inc.

In the modeling environment 820, one or more instructions may be generated for the model 822. The instructions may be, for example source code, intermediate representations, etc., to be used to simulate the model or to execute the model on a target device. The generated instructions may be stored in a repository 824. The modeling environment 820 may enable processing the model 822 using the instructions previously stored in the repository 824.

Modeling environment 820 may communicate with repository 824. Modeling environment 800 may generate instructions for model 822 and store the instructions in the repository 824. The instructions may be stored in the repository 824, for example, as functions 856 in software. Note that the instructions may be stored in the repository 824 other forms, such as processes that may be implemented in hardware. The instructions stored in the repository 824 may be shared in processing other models to reduce memory or other requirements for processing other models.

The repository 824 may include a collection of information that may be stored in memory or storage. The repository 824 may be, for example, a database with code for functions and checksums for one or more of the functions.

The modeling environment 820 may also include user interfaces 858 and an execution engine 860. The modeling environment 820 may allow a user to build model 822 of a system using user interfaces 858. The model 822 may include, for example, blocks and lines. The blocks may define operations, and the lines may define relationships between the blocks.

The execution engine 860 may compile and link the model 822 to generate an executable form of instructions for carrying out execution of the model. The model 822 may be executed to simulate the system represented by the model 822. The simulation of the model 822 may determine the behavior of the system represented by the model 822.

The execution engine 860 may convert the model into an executable form. The executable form may include one or more executable instructions. The execution engine 860 may compile and link the model to produce the executable form of the model. The executable form of the model may be executed to determine a behavior of the model. Compiling may involve checking an integrity and validity of one or more component interconnections in the model. Here, the execution engine 860 may also sort one or more components in the model into hierarchical lists that may be used to create one or more component method execution lists. When linking the model, the execution engine 860 may use one or more results from the compilation of the model to, for example, allocate memory that may be needed for an execution of the executable form of the model. Linking may also involve producing one or more component method execution lists that may be used in the execution of the executable form. The block method execution lists may be generated because the components of a model may execute component methods by type (not by component) when the component has a sample hit. The execution engine 860 may repetitively execute the instructions e.g., via successive time steps from an execution start time to a stop time specified by the user or until the execution is interrupted.

The execution engine 860 may enable interpretive execution of part or all of the model. Likewise, the execution engine 860 may enable compiled or accelerated execution of some or all of the model. Combinations of interpretive and compiled or accelerated execution may also be enabled by the execution engine 860.

The semantic engine 862 may identify semantically relevant objects in the model 822 and apply visual indications to the model 822 based on the identification of semantically relevant objects. The semantic engine 862 may perform one or more acts depicted in FIGS. 5A-5C.

Figure 9:
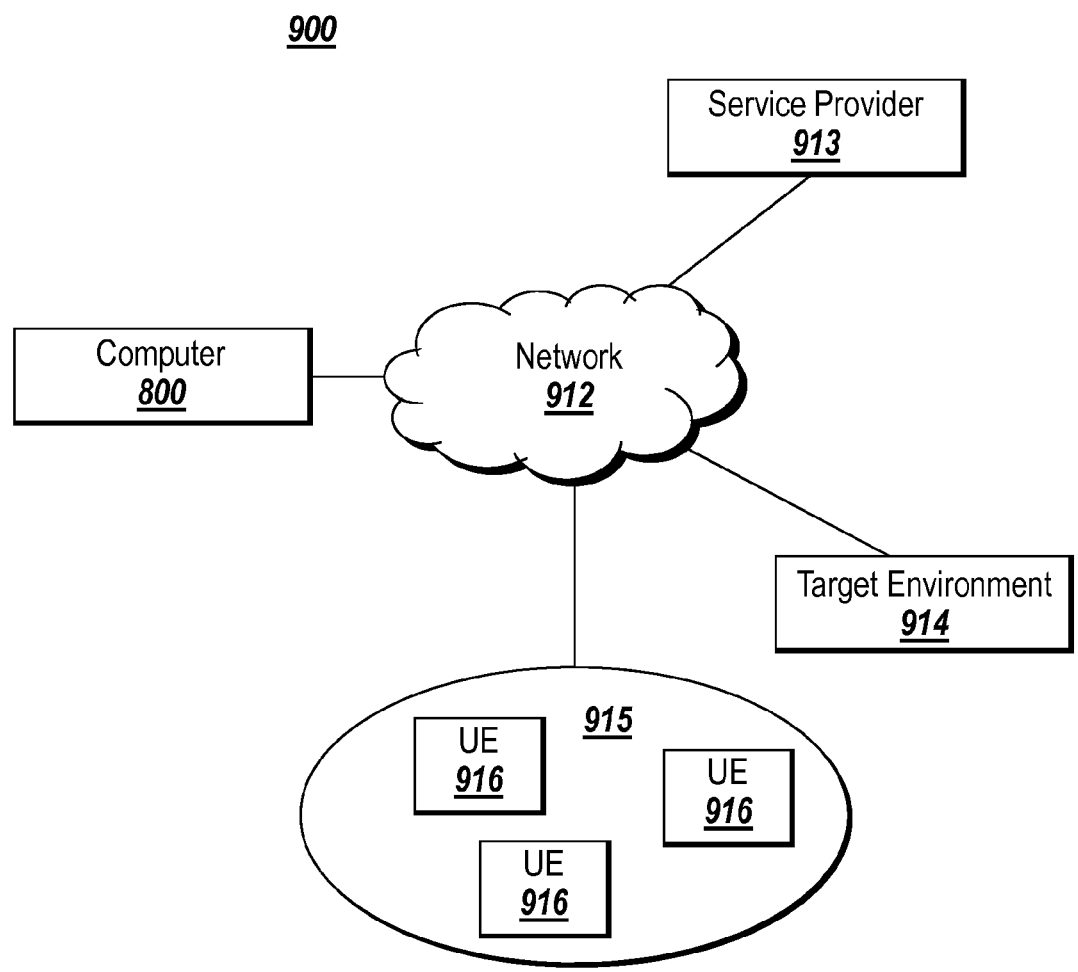
FIG. 9 depicts a network implementation that may be suitable for use with one or more embodiments disclosed herein.

FIG. 9 depicts a network implementation that may implement one or more embodiments of the invention. A system 900 may include a computing device 800 a network 912, a service provider 913, a target environment 914, and a cluster 915. The embodiment of FIG. 9 is exemplary, and other embodiments can include more devices, fewer devices, or devices in arrangements that differ from the arrangement of FIG. 9.

The network 912 may transport data from a source to a destination. Embodiments of the network 912 may use network devices, such as routers, switches, firewalls, and/or servers (not shown) and connections (e.g., links) to transport data. 'Data,' as used herein, may refer to any type of machine-readable information having substantially any format that may be adapted for use in one or more networks and/or with one or more devices (e.g., the computer 900, the service provider 913, etc.). Data may include digital information or analog information. Data may further be packetized and/or non-packetized.

The network 912 may be a hardwired network using wired conductors and/or optical fibers and/or may be a wireless network using free-space optical, radio frequency (RF), and/or acoustic transmission paths. In one implementation, the network 912 may be a substantially open public network, such as the Internet. In another implementation, the network 912 may be a more restricted network, such as a corporate virtual network. The network 912 may include Internet, intranet, Local Area Network (LAN), Wide Area Network (WAN), Metropolitan Area Network (MAN), wireless network (e.g., using IEEE 802.11, Bluetooth, etc.), etc. The network 912 may use middleware, such as Common Object Request Broker Architecture (CORBA) or Distributed Component Object Model (DCOM). Implementations of networks and/or devices operating on networks described herein are not limited to any particular data type, protocol, architecture/configuration, etc.

The service provider 913 may include a device that makes a service available to another device. For example, the service provider 913 may include an entity (e.g., an individual, a corporation, an educational institution, a government agency, etc.) that provides one or more services to a destination using a server and/or other devices. Services may include instructions that are executed by a destination to perform an operation (e.g., an optimization operation). Alternatively, a service may include instructions that are executed on behalf of a destination to perform an operation on the destination's behalf.

The target environment 914 may include a device that receives information over the network 912. For example, the target environment 914 may be a device that receives user input from the computer 910.

The cluster 915 may include a number of units of execution (UEs) 916 and may perform processing on behalf of the computer 900 and/or another device, such as the service provider 913. For example, the cluster 915 may perform parallel processing on an operation received from the computer 900. The cluster 915 may include UEs 916 that reside on a single device or chip or that reside on a number of devices or chips.

The units of execution (UEs) 916 may include processing devices that perform operations on behalf of a device, such as a requesting device. A UE may be a microprocessor, field programmable gate array (FPGA), and/or another type of processing device. UE 916 may include code, such as code for an operating environment. For example, a UE may run a portion of an operating environment that pertains to parallel processing activities. The service provider 913 may operate the cluster 915 and may provide interactive optimization capabilities to the computer 910 on a subscription basis (e.g., via a web service).

Units of Execution (UEs) provide remote/distributed processing capabilities for our products, such as MATLAB® from The MathWorks, Inc. A hardware unit of execution may include a device (e.g., a hardware resource) that may perform and/or participate in parallel programming activities. For example, a hardware unit of execution may perform and/or participate in parallel programming activities in response to a request and/or a task it has received (e.g., received directly or via a proxy). A hardware unit of execution may perform and/or participate in substantially any type of parallel programming (e.g., task, data, stream processing, etc.) using one or more devices. For example, a hardware unit of execution may include a single processing device that includes multiple cores or a number of processors. A hardware unit of execution may also be a programmable device, such as a field programmable gate array (FPGA), an application specific integrated circuit (ASIC), a digital signal processor (DSP), or other programmable device. Devices used in a hardware unit of execution may be arranged in many different configurations (or topologies), such as a grid, ring, star, or other configuration. A hardware unit of execution may support one or more threads (or processes) when performing processing operations.

A software unit of execution may include a software resource (e.g., a technical computing environment) that may perform and/or participate in one or more parallel programming activities. A software unit of execution may perform and/or participate in one or more parallel programming activities in response to a receipt of a program and/or one or more portions of the program. A software unit of execution may perform and/or participate in different types of parallel programming using one or more hardware units of execution. A software unit of execution may support one or more threads and/or processes when performing processing operations.

The term 'parallel programming' may be understood to include multiple types of parallel programming, e.g. task parallel programming, data parallel programming, and stream parallel programming. Parallel programming may include various types of processing that may be distributed across multiple resources (e.g., software units of execution, hardware units of execution, processors, microprocessors, clusters, labs) and may be performed at the same time.

For example, parallel programming may include task parallel programming where a number of tasks may be processed at the same time on a number of software units of execution. In task parallel programming, a task may be processed independently of other tasks executing, for example, at the same time.

Parallel programming may include data parallel programming, where data (e.g., a data set) may be parsed into a number of portions that may be executed in parallel using, for example, software units of execution. In data parallel programming, the software units of execution and/or the data portions may communicate with each other as processing progresses.

Parallel programming may include stream parallel programming (also referred to as pipeline parallel programming). Stream parallel programming may use a number of software units of execution arranged, for example, in series (e.g., a line) where a first software unit of execution may produce a first result that may be fed to a second software unit of execution that may produce a second result given the first result. Stream parallel programming may also include a state where task allocation may be expressed in a directed acyclic graph (DAG) or a cyclic graph.

Other parallel programming techniques may involve some combination of task, data, and/or stream parallel programming techniques alone or with other types of processing techniques to form hybrid-parallel programming techniques.

The foregoing description may provide illustration and description of various embodiments of the invention, but is not intended to be exhaustive or to limit the invention to the precise form disclosed. Modifications and variations may be possible in light of the above teachings or may be acquired from practice of the invention. For example, while a series of acts has been described above, the order of the acts may be modified in other implementations consistent with the principles of the invention. Further, non-dependent acts may be performed in parallel.

In addition, one or more implementations consistent with principles of the invention may be implemented using one or more devices and/or configurations other than those illustrated in the Figures and described in the Specification without departing from the spirit of the invention. One or more devices and/or components may be added and/or removed from the implementations of the figures depending on specific deployments and/or applications. Also, one or more disclosed implementations may not be limited to a specific combination of hardware.

Furthermore, certain portions of the invention may be implemented as logic that may perform one or more functions. This logic may include hardware, such as hardwired logic, an application-specific integrated circuit, a field programmable gate array, a microprocessor, software, or a combination of hardware and software.

No element, act, or instruction used in the description of the invention should be construed critical or essential to the invention unless explicitly described as such. Also, as used herein, the article "a" is intended to include one or more items. Where only one item is intended, the term "a single" or similar language is used. Further, the phrase "based on," as used herein is intended to mean "based, at least in part, on" unless explicitly stated otherwise. In addition, the term "user", as used herein, is intended to be broadly interpreted to include, for example, a computing device (e.g., a workstation) or a user of a computing device, unless otherwise stated.

The scope of the invention is defined by the claims and their equivalents.

The invention claimed is:

1. An electronic device implemented method, comprising:
    displaying, using a processor, a plurality of graphical elements of an executable graphical model of a dynamic system on a display device;
    receiving an indication of a graphical operation, the graphical operation:
        involving a plurality of source graphical elements, and
        establishing a relationship between the plurality of source graphical elements and two or more target graphical elements of the plurality of graphical elements;
    identifying the target graphical elements from among the plurality of graphical elements when the target graphical elements are compatible with:
        the graphical operation, and
        one or more characteristics associated with the source graphical elements, the one or more characteristics of the source graphical elements comprising one or more of: a block sample time, a block restrictive flag, a port dimension attribute, a data type of data supplied by the source graphical element, a sample rate, a data complexity, a unit attribute, a physical domain attribute, a value range, and a data dimensionality; and
    visually indicating the identified target graphical elements are compatible with the graphical operation on the display device.

2. The method of claim 1, wherein the graphical model is a graphical block diagram model.

3. The method of claim 2, wherein the source graphical elements are ports in the graphical block diagram model.

4. The method of claim 1, further comprising performing the graphical operation, wherein the performing causes the relationship to be established between the source graphical elements and the target graphical elements, the relationship being indicated on a display by graphical connections that connect the source graphical elements with the target graphical elements.

5. The method of claim 1, wherein the graphical operation is a drag-and-drop action that involves selecting the source graphical elements using a cursor, dragging the cursor, and dropping the cursor onto at least one of the target graphical elements to establish the relationship between the source graphical elements and the at least one of the target graphical elements.

6. The method of claim 1, further comprising:
    identifying one or more properties of the source graphical elements; and
    identifying the target graphical elements based on one or more properties of the target graphical elements that are compatible with one or more properties of the source graphical elements.

7. The method of claim 6, wherein identifying the target graphical elements further comprises:
    searching among the plurality of graphical elements, wherein the search of the plurality of graphical elements is limited based on a proximity of the source graphical elements to a searched element on the display device.

8. The method of claim 1, wherein receiving an indication further comprises:
    receiving a selection of the source graphical elements.

9. The method of claim 1, wherein visually indicating that the identified target graphical elements are compatible with the graphical operation is performed after the indication is received and before the graphical operation is resolved by attempting to establish the relationship.

10. The method of claim 1, wherein visually indicating comprises highlighting the identified target graphical elements.

11. The method of claim 1, wherein an incompatible graphical element in the plurality of graphical elements is not compatible with the graphical operation and wherein visually indicating further comprises changing a visual appearance of the incompatible graphical element on the display device.

12. The method of claim 1, wherein the identifying comprises:
    applying one or more rules.

13. The method of claim 1, further comprising:
    identifying a degree of compatibility of the target graphical elements with the graphical operation and the one or more characteristics of the source graphical elements.

14. The method of claim 13, wherein the visual indicating produces a visual indication of the degree of compatibility.

15. One or more non-transitory computer-readable storage media for storing computer-executable instructions, the instructions comprising:
    instructions that, when executed by a processor, cause the processor to:
        display a plurality of graphical elements of an executable graphical model of a dynamic system on a display device;
        receive an indication to initiate a graphical operation involving a source graphical element from among the plurality of graphical elements,
        the graphical operation when performed establishing a relationship between the source graphical element and a target graphical element from among the plurality of graphical elements; and
    visually indicating that the target graphical element is compatible with the graphical operation and one or more characteristics of the source graphical element on the display device prior to conducting the graphical operation, the one or more characteristics of the source graphical elements comprising one or more of: a block sample time, a block restrictive flag, a port dimension attribute, a data type of data supplied by the source graphical element, a sample rate, a data complexity, a unit attribute, a physical domain attribute, a value range, and a data dimensionality.

16. The media of claim 15, wherein visually indicating further comprises:
highlighting the target graphical element.

17. The media of claim 15, further storing one or more instructions for:
identifying whether the target graphical element is suitable for the graphical operation based on one or more rules.

18. A system comprising:
a display device; and
a processor for:
displaying a plurality of graphical elements of an executable graphical model of a dynamic system on the display device;
receiving a selection of multiple source graphical elements from among the plurality of graphical elements;
initiating a graphical operation to establish a relationship between the multiple source graphical elements of the displayed plurality of graphical elements and at least one target graphical element of the displayed plurality of graphical elements that is compatible with the graphical operation; and
visually indicating whether the at least one target graphical element is compatible with the graphical operation and one or more characteristics of the multiple source graphical elements on the display device prior to performing the graphical operation, the one or more characteristics of the multiple source graphical elements comprising one or more of: a block sample time, a block restrictive flag, a port dimension attribute, a data type of data supplied by the source graphical element, a sample rate, a data complexity, a unit attribute, a physical domain attribute, a value range, and a data dimensionality.

* * * * *

UNITED STATES PATENT AND TRADEMARK OFFICE
CERTIFICATE OF CORRECTION

| | |
|---|---|
| PATENT NO. | : 8,904,302 B2 |
| APPLICATION NO. | : 12/895187 |
| DATED | : December 2, 2014 |
| INVENTOR(S) | : Daniel F. Higgins et al. |

Page 1 of 1

It is certified that error appears in the above-identified patent and that said Letters Patent is hereby corrected as shown below:

Title page, under item "(75) Inventors", line 4, after "Kenneth Weiss" delete "Farmingham," and insert --Framingham-- in lieu thereof.

Signed and Sealed this
Twenty-first Day of April, 2015

Michelle K. Lee
*Director of the United States Patent and Trademark Office*